3 Sheets—Sheet 1.
E. D. MEIER.
Hydraulic Joint.
No. 228,209.      Patented June 1, 1880.
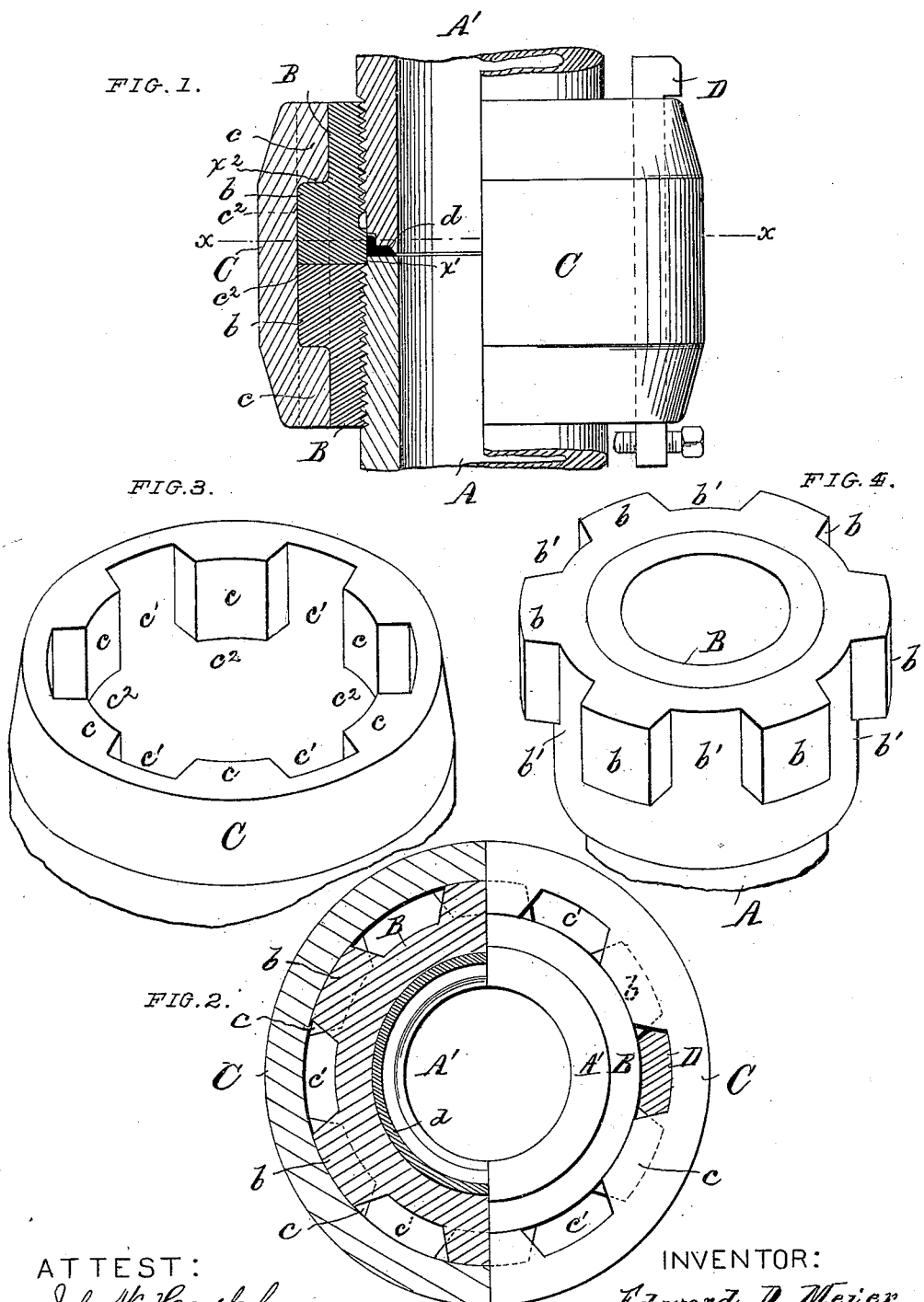

3 Sheets—Sheet 2.

E. D. MEIER.
Hydraulic Joint.

No. 228,209. Patented June 1, 1880.

ATTEST:
John W. Herthel.
Chas. Herthel.

INVENTOR:
Edward D. Meier
per Herthel & Co.

3 Sheets—Sheet 3.

E. D. MEIER.
Hydraulic Joint.

No. 228,209. Patented June 1, 1880.

ATTEST:
John W. Herthel
Chas. Herthel

INVENTOR:
Edward D. Meier
per Herthel & Co

UNITED STATES PATENT OFFICE.

EDWARD D. MEIER, OF ST. LOUIS, MISSOURI.

HYDRAULIC JOINT.

SPECIFICATION forming part of Letters Patent No. 228,209, dated June 1, 1880.

Application filed October 21, 1879.

*To all whom it may concern:*

Be it known that I, EDWARD D. MEIER, of St. Louis, Missouri, have invented an Improved Hydraulic Joint, of which the following is a specification.

This invention relates to improvements on hydraulic joints for pipes, valves, cylinders, &c., containing liquid under pressure, and which I term the "bayonet-joint."

I will first fully describe the construction and arrangement of my improvements, also the advantages derived from their application and use, and hereinafter point out the novel features thereof in the claims.

Of the drawings, Sheet I, Figure 1 is a part side and sectional elevation of my improved joint as applied to pipes. Fig. 2 is a part plan and plan section taken on line $x\,x$ of Fig. 1. Fig. 3 is a part perspective view of simply the casting or muff employed. Fig. 4 is a perspective of one end of a pipe having the flange or gland, and which, in conjunction with the muff aforesaid, constitutes my lock or bayonet-joint.

Figure 5:
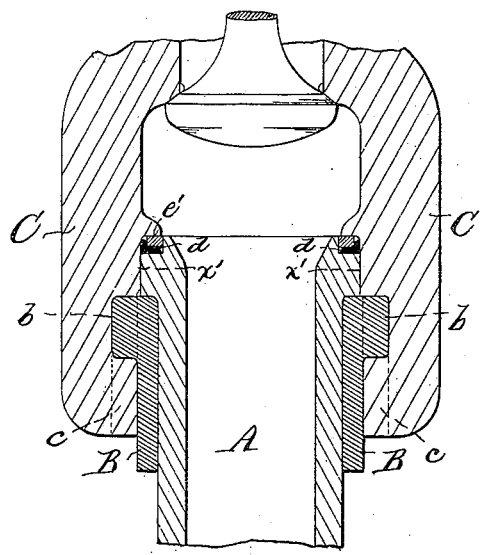
Figure 7:
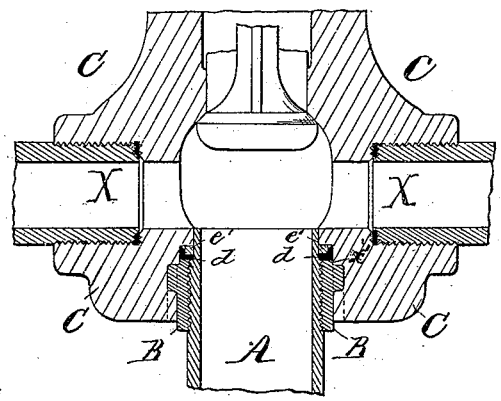
Figure 6:
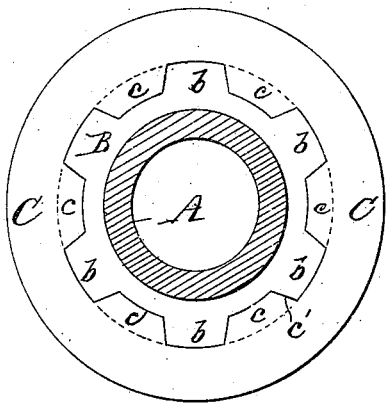
Figure 8:
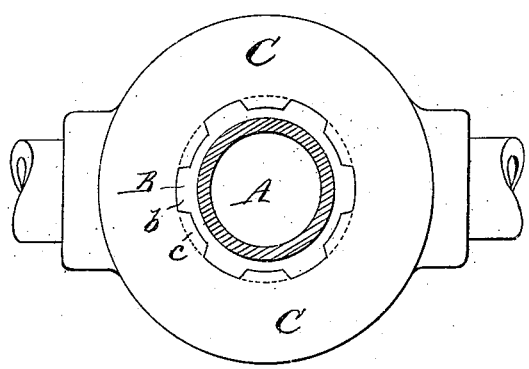

Sheet II represents in the different figures modifications of my invention as applied to a valve-chamber, Figs. 5 and 7 each being a sectional elevation, the latter figure showing the old style of a joint, (marked X the more clearly to compare it with my improvement,) Figs. 6 and 8 being respective plan views of Figs. 5 and 7.

Figure 9:
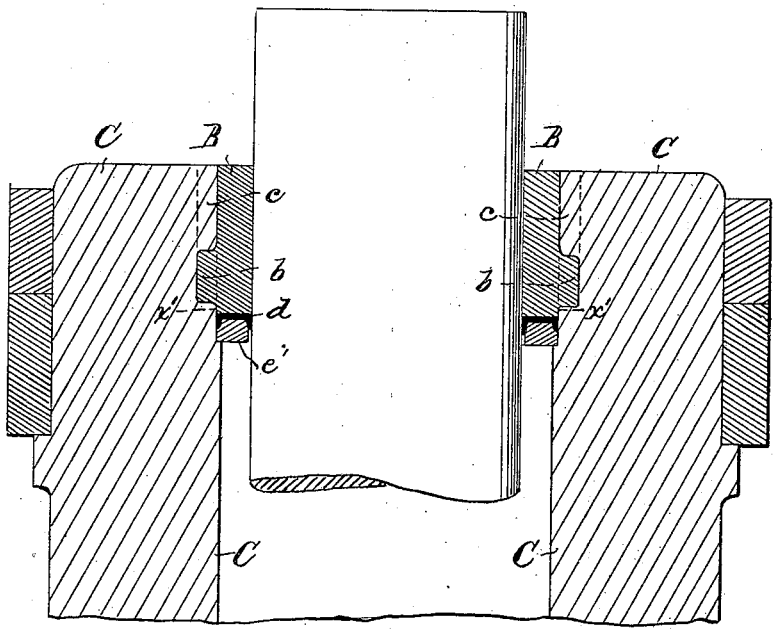
Figure 10:
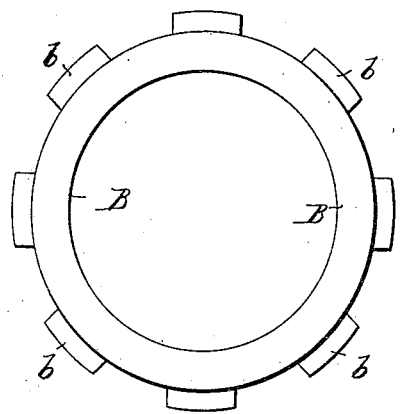

Sheet III illustrates my invention as applied to a cylinder containing a plunger, the said joint being also here shown as a modification, Fig. 9 being a sectional elevation, and Fig. 10 a plan view, of the flange or gland.

A A' represent the pipes to be joined.

B represents the flange or gland used to constitute one part of the lock for the bayonet-joint. The flange or gland B (shown in Figs. 1, 2, 4 as a separate piece) is made to have a series of lugs, $b$, with openings or slots $b'$ between. So made, this gland can be screwed, brazed, welded, or otherwise made to form part of the contiguous pipe ends; or said gland can be in halves or pieces, (see Figs. 5 and 6,) so that each end of the pipes have the like parts or lugs with openings between. (See Figs. 1 and 4.)

C represents the external casting or muff to constitute the remainder of the lock for the bayonet-joint. The casting C, as a separate piece, has the upper and lower like series of lugs, $c$, with openings, slots, or recesses $c'$ between, and the further annular space or recess $c^2$ in its body. (See Figs. 1, 2, 3.)

The constructive relationship between the external casting and internal gland is such that, first, the openings $c'$ of the former serve to fit or pass the same over the lugs $b$ of the latter preparatory to coupling said parts; secondly, the annular recess $c^2$ permits the casting to be turned in either direction to bring its lugs in line with the lugs of the gland. When the casting has been so turned that its lugs are in juxtaposition, as shown, a plain key or wedge, D, is passed through the openings, so as to prevent the accidental turning of the parts, and a set-screw, spring, or simple lock may be used to keep the key in such position until it is desirable to break the joint. (See Figs. 1, 2.)

$d$ (see Fig. 1) is the cup-packing; but any other well-known packing can be used. The packing is contained between the joining faces of the pipes. I form the end of the pipe A' to correspond in shape to that of the packing, so as to properly support the same, as shown.

Special stress is laid upon the substitution of the cylindrical surface evolved about the axis of the pipe, and hence parallel to it, on which the joint is made, instead of a break or opening square across or perpendicular to said axis, and to make the outside or crimped angle of the packing apply on this cylindrical surface; secondly, to take the strain on this joint, when thus and there made, on the lugs of the gland and casting, brought as close to the pipe, gland, fitting, or cylinder as possible.

It will be noted that under the convex corner or angle of the packing, as at $x'$, there is always a prolongation or extension of the cylindrical surface, so that in case of any slight stretching of the parts the packing would still find a support on metal to metal. The surfaces where the lugs $b\,c$ bear on each other are "trued-off" to the same general contour, preferred to be at right angles to the axis of the joint, or nearly so. The inside faces of the lugs $c$ bear evenly and smoothly on the outer cylindrical surface of the flange or gland, so as to there receive and take up any lateral strains arising from any accidental causes.

My joint is not under strain when the inside hydrostatic pressure is removed, as all screw or bolt joints are. Since the surfaces marked $x^2$, where the strains from the lugs $b$ are transmitted to the lugs $c$, are all true and of the same inclination to the axis of the joint, which is also the axis of the strains, these strains will be equally distributed over these surfaces and lugs, and any extraneous tendency to lateral displacement of the pipes or glands will thus be counteracted by the pressure in the pipe.

In the ordinary bolt or screw joints of this class any variation in the strains put on the screws in tightening up is increased by the strains due to the hydrostatic pressure. When the overstrained bolt gives way the whole joint fails to be practically efficient for its purpose.

By the use of the lugs $b\ c$ in place of bolts the strains are borne very close to the point where they originate, and no bending strains are put upon the flanges, which is unavoidable when using bolts, since the necessary diameter of nuts and heads carries the bolts farther out from the center.

In Figs. 5, 6, 7, 8 the same parts constituting my improvements are shown applied to a valve-chamber. In this case the pipe A, leading to the valve-chamber, has the same prolongation, extension, or cylindrical surface (marked $x'$) as described, and shown in Fig. 1. The said extension also here serves as a collar or a shoulder, and between its upper face and the under face of the valve-seat the packing $d$ is secured. Under the extension or collar $x'$ the same flange or gland B applies to hold the pipe to its place.

The valve-chamber is fitted to be or constitute the external muff or casting, C—that is, constructively related to the flange B, to conjointly form the lock or bayonet-joint, as above described and shown. A packing-ring, $e'$, is, however, added in this case to support the packing.

To disconnect or connect the parts, the same fitting of the parts and the same operation take place as previously described. In the use of the parts so applied to connect or join a fitting or valve-chamber the same advantages and results are achieved, specially be it noted, in regard to giving the packing a firm metal support by virtue of the extension $x'$ of the pipe into the recess fitted to receive it, and under the packing, as shown.

In Figs. 9, 10 I show my bayonet-joint applied to a cylinder having a plunger moving in same. In this case the cylinder is the same as the external muff or casting, C—that is, formed to have at its open end the series of lugs, openings between them, and the annular recess in its body. The flange or gland B is likewise here shown, and it is also identically the same so far as its constructive relationship to have corresponding lugs, openings, and fit of these parts with C is concerned.

$d$ is the packing, interposed and held secure between the under face of the flange or gland B and the face of the supporting-ring $e'$. It will be noted that the extension or prolongation of the cylinder-surface (see $x'$) exists here also. This adaptation of the parts insures the same advantages and results.

What I claim is—

1. The external muff, C, having lugs $c$, openings $c'$, the annular space $c^2$, the latter permitting the said muff to be turned either to the right or left when same is fitted on the flange or glands B, this latter having similar lugs and openings to those on the muff, said parts combined with the ends of pipes or parts to be jointed, forming the improved bayonet or hydraulic joint, as shown and described.

2. In a hydraulic joint, the combination of the glands B B, pipes A A', the packing $d$, the said parts constructively related to each other, as shown and described, so that the joining-line of the contiguous faces of the glands exists below the joining-line of the faces of the pipes or parts requiring a joint, forming the prolongation of the pipes or gland $x'$, by means whereof the said packing is arranged and supported in the manner and for the purposes set forth.

3. The combination of the external muff, C, having lugs $c$, openings $c'$, the annular space $c^2$, the latter permitting the said muff to be turned either to the right or left when same is fitted on the flange or glands B, the latter each having like openings and lugs as said muff, said parts further being arranged with relation to the ends of pipes or parts to be jointed by leaving the prolongation of metal at $x'$ underneath the packing, by means whereof the fitting, joining, and interlocking of all said parts, also support for the packing, is achieved, in the manner and for the purposes set forth.

4. The key, wedge, or gib D, passing through the openings between the lugs $b\ c$ of a flange or gland and muff or casting, when said parts are engaged, to prevent the turning or loosening of the joint, as set forth.

In testimony of said invention I have hereunto set my hand.

EDWARD D. MEIER.

Witnesses:
 WILLIAM W. HERTHEL,
 JOHN W. HERTHEL.